United States Patent
Kühne

(10) Patent No.: US 9,533,682 B2
(45) Date of Patent: Jan. 3, 2017

(54) METHOD FOR OPERATING A MOTOR VEHICLE WHEN CHANGING LANES, AND MOTOR VEHICLE

(71) Applicant: AUDI AG, Ingolstadt (DE)

(72) Inventor: Marcus Kühne, Beilngries (DE)

(73) Assignee: Audi AG, Ingolstadt (DE)

(*) Notice: Subject to any disclaimer, the term of this patent is extended or adjusted under 35 U.S.C. 154(b) by 0 days.

(21) Appl. No.: 14/902,481

(22) PCT Filed: Jun. 7, 2014

(86) PCT No.: PCT/EP2014/001563
§ 371 (c)(1),
(2) Date: Dec. 31, 2015

(87) PCT Pub. No.: WO2015/000547
PCT Pub. Date: Jan. 8, 2015

(65) Prior Publication Data
US 2016/0137199 A1    May 19, 2016

(30) Foreign Application Priority Data
Jul. 1, 2013 (DE) .......... 10 2013 010 983

(51) Int. Cl.
*B60W 30/095* (2012.01)
*B60W 50/14* (2012.01)
(Continued)

(52) U.S. Cl.
CPC .......... *B60W 30/0956* (2013.01); *B60W 10/20* (2013.01); *B60W 10/30* (2013.01);
(Continued)

(58) Field of Classification Search
CPC ....................... B60W 30/18163; B60W 30/095
See application file for complete search history.

(56) References Cited

U.S. PATENT DOCUMENTS 7,893,819 B2   2/2011   Pfeiffer et al.
8,244,408 B2 *   8/2012   Lee ................... B60W 30/0953
                                                              180/169
(Continued)

FOREIGN PATENT DOCUMENTS

DE       10012737 A1    9/2001
DE    102006010275 A1    12/2006
(Continued)

OTHER PUBLICATIONS

Search report from corresponding German Application No. 102013010983.3, dated Mar. 3, 2014 (6 pages).
(Continued)

*Primary Examiner* — Thomas G Black
*Assistant Examiner* — Peter D Nolan
(74) *Attorney, Agent, or Firm* — Alston & Bird LLP

(57) ABSTRACT

The invention relates to a method for operating a motor vehicle when changing lanes on a roadway consisting of at least three lanes, with the steps: detection by a monitoring system in the vehicle of an impending lane change of the motor vehicle from a first lane to an adjoining second lane; detection of an impending lane change by another vehicle from a third lane that adjoins the second lane, to the second lane; the monitoring system determining whether a collision with the other vehicle threatens if the vehicle changes lanes; as soon as a threatened collision is determined, a warning signal is issued by a warning device and/or the motor vehicle is influenced in its lateral motion by a driver assistance system of the vehicle. In addition, it relates to a motor vehicle with a monitoring system.

11 Claims, 2 Drawing Sheets

Figure 1:
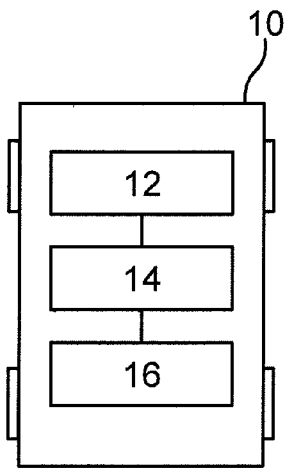

(51) Int. Cl.
*B60W 30/18* (2012.01)
*B60W 10/20* (2006.01)
*B60W 10/30* (2006.01)
*B60W 30/09* (2012.01)

(52) U.S. Cl.
CPC ...... *B60W 30/09* (2013.01); *B60W 30/18163* (2013.01); *B60W 50/14* (2013.01); *B60W 2400/00* (2013.01); *B60W 2520/10* (2013.01); *B60W 2540/18* (2013.01); *B60W 2540/20* (2013.01); *B60W 2550/20* (2013.01); *B60W 2550/30* (2013.01); *B60W 2710/20* (2013.01); *B60W 2710/30* (2013.01)

(56) References Cited

U.S. PATENT DOCUMENTS

| | | | | |
|---|---|---|---|---|
| 8,831,867 | B2* | 9/2014 | Bald | B60W 50/0097 701/300 |
| 9,251,709 | B2* | 2/2016 | Dupont | G08G 1/167 |
| 2008/0208408 | A1 | 8/2008 | Arbitmann et al. | |
| 2010/0228419 | A1* | 9/2010 | Lee | B60W 30/0953 701/25 |
| 2012/0271539 | A1* | 10/2012 | Bald | B60W 50/0097 701/300 |
| 2015/0145694 | A1* | 5/2015 | Dupont | G08G 1/167 340/903 |

FOREIGN PATENT DOCUMENTS

| | | |
|---|---|---|
| DE | 102005036714 A1 | 2/2007 |
| DE | 102005059598 A1 | 6/2007 |
| DE | 102010054221 A1 | 8/2011 |
| DE | 102010003099 A1 | 9/2011 |
| DE | 102011018159 | 10/2012 |
| DE | 102011080928 A1 | 2/2013 |
| EP | 2028072 A2 | 2/2009 |

OTHER PUBLICATIONS

International Search Report of corresponding international application No. PCT/EP2014/001563, dated Sep. 5, 2014 (10 pages)
International Preliminary Examination Report and Written Opinion of corresponding International Application No. PCT/EP2014/001563, dated Jun. 24, 2015 (5 pages).
International Preliminary Report on Patentability and Written Opinion of corresponding International Application No. PCT/EP2014/001563, dated Dec. 4, 2015 (14 pages).
International Preliminary Report on Patentability (Chapter II) from International Application No. PCT/EP2014/001563, dated Jan. 7, 2016.

* cited by examiner

METHOD FOR OPERATING A MOTOR VEHICLE WHEN CHANGING LANES, AND MOTOR VEHICLE

CROSS REFERENCE TO RELATED APPLICATIONS

This application is a national stage 371 application of International Application No. PCT/EP2014/001563, filed Jun. 7, 2014, which claims priority to and the benefit of German Application No. 102013010983.3, filed Jul. 1, 2013, the entire contents of which are hereby incorporated by reference.

The invention relates to a method for operating a motor vehicle when changing lanes on a roadway consisting of at least three lanes, as well as a motor vehicle with a monitoring system.

Particularly on directional rights of way that have three or more lanes, there is increased danger of accidents when various vehicles change lanes. What is meant by a directional roadway is a unidirectional roadway, all lanes going in the same direction. An especially dangerous driving situation is, for example, when two different vehicles simultaneously move to a center lane. If, for example, a vehicle is trying to make a lane change from the left outer lane to a center lane, and simultaneously a vehicle is trying to switch from the right outer lane to a middle lane, dangerous driving conditions can result, in the form of a near-collision or even an actual collision.

DE 10 2005 036 714 A1 discloses a method for providing support for the driver of a vehicle when changing lanes. The lane change of a vehicle is monitored in that when a dangerous situation is perceived, the vehicle automatically switches back to the original lane, as long as the original lane is detected as remaining unoccupied.

DE 10 2006 010 275 A1 discloses a method for avoiding a vehicle collision when changing lanes. As soon as another vehicle is detected when making a lane change from a first to a second lane, a warning message is issued, or the vehicle starts to return to the first, or original, lane.

DE 100 12 737 A1 discloses a device for a vehicle to make a lane change. If obstacles are detected in the target lane during a lane change, the change in lanes is automatically interrupted, with an automatic return to the original lane.

DE 10 2005 059 598 A1 discloses a collision avoidance system for vehicles traveling behind each other, but not in alignment. A rearward and lateral space of a first vehicle is monitored, and the steering of the first vehicle is automatically interfered with, if another vehicle is detected that is moving in an area to the rear and/or side of the vehicle, and it has simultaneously been detected that the driver of the first vehicle would like to change lanes.

DE 10 2010 054 221 A1 discloses a driver assistance system for a vehicle changing lanes. If, during a lane change, it is determined that a collision threatens, a warning is issued.

The task of the present invention is to reduce the danger of a collision when a motor vehicle is changing lanes on a roadway with at least three unidirectional lanes.

This problem is solved by a method for operating a motor vehicle, as well as a motor vehicle with the features of the independent patent claims. Advantageous embodiments with appropriate and non-trivial further developments of the invention are indicated in the dependent claims.

The invention-specific method for driving a motor vehicle when changing lanes on a unidirectional roadway comprising at least three lanes, comprises the following steps:

Detection by a monitoring system in the vehicle of an impending lane change of the motor vehicle from a first lane to an adjoining second lane;

Detection of an impending lane change by another vehicle from a third lane that adjoins the second lane, to the second lane;

The monitoring system determining whether a collision with the other vehicle threatens if the vehicle changes lanes;

As soon as a threatened collision is determined, a warning signal is issued by a warning device and/or the motor vehicle is influenced in its lateral motion by a driver assistance system of the vehicle.

Thus, according to the invention, as soon as an impending lane change of the motor vehicle is detected, an area two lanes over is monitored, and a determination is made of whether a vehicle is in motion or is located there, which can also be counted on to move to the lane between the ones the two vehicles are traveling on. As soon as both vehicles are detected as intending to switch to a common lane, especially a middle one, a warning signal is issued and/or the vehicle is appropriately guided to the side to avoid the collision. This substantially reduces the particularly hazardous driving situations when driving on rights of way with three or more lanes, all of which are to be in the same direction. Through early detection that one vehicle and another vehicle have an essentially simultaneous intent to change lanes, the danger of a near-collision or of an actual collision between the vehicle and the other vehicle can be substantially reduced, or even totally eliminated.

In an advantageous embodiment of the invention, provision can be made to detect an impending lane change of the vehicle by correspondingly activating a turn signal, or by a steering motion of the vehicle to this effect. Thus, it does not have to be first detected that the vehicle has, for example, crossed over a lane edge marker line. Rather, by a detected blinker activation or a steering action of the vehicle to that effect, an impending lane change can be detected in anticipation and thus in timely fashion.

In another advantageous embodiment of the invention, provision is made that the other vehicle is about to change lanes, by means of a corresponding activation of the blinker or by means of a lateral motion of the vehicle being detected. By this means, a possible impending lane change of the other vehicle can also be detected especially early, for example even before the other vehicle has passed over a lane edge marker line.

In another advantageous embodiment of the invention, provision is made that the warning signal already be issued as soon as an impending lane change of the one vehicle and of the other vehicle is detected. Thus, the driver of the vehicle is given particularly timely early notification of a possibly dangerous situation.

Another advantageous embodiment of the invention makes provision that, by means of the monitoring system, a monitored area comprising the second and third lane is monitored in zonal fashion. Preferably the monitored area comprises both an area in front of the vehicle and behind the vehicle in the longitudinal direction, which covers the second and third lanes of the roadway in the transverse direction of the road. By this means, early and safe detection can be made of appropriate vehicles in the third lane, so that this monitoring information can be used to detect, in timely fashion, whether a vehicle intends to change lanes, which would like to switch from the third lane to the second lane.

According to a further advantageous embodiment of the invention, provision is made that as long as the other vehicle is situated in the first monitoring area, the motion of the vehicle is detected, and with the use of it, a determination is made of an impending lane change of the vehicle. By this means, a corresponding intent of the other vehicle to change lanes can be detected early, so that the driver of the vehicle can be warned in timely fashion or the driver assistance system of the vehicle can influence the lateral motion of the vehicle, to prevent a threatened collision with the other vehicle, thus without engaging the driver.

In another advantageous embodiment of the invention, provision is made that, as long as the vehicle is located in the first monitoring area, the relative motion of the vehicle vis-à-vis the motor vehicle is detected, and using which it is detected whether a collision threatens when the motor vehicle changes lanes. By this means, in a particularly reliable fashion, the probability of a possible collision between the motor vehicle and the other vehicle can be detected. If a collision is determined to be probable, then for example the particular motion trajectories can be extrapolated using the currently detected relative motion, to determine whether there is a danger of a collision if the particular lane change is made.

Another advantageous embodiment of the invention makes provision that it becomes difficult to execute the impending lane change, or it is prevented, as soon as a determination of a threatened collision with the other vehicle has been made. It becomes difficult, for example, to carry out the impending vehicle lane change, in that increased torque has to be applied to steer the motor vehicle. In other words, steering resistance is increased, at leased in the direction that corresponds with the planned lane change. It is also possible as an alternative that the driver assistance system automatically interferes with the steering of the vehicle, so that the vehicle is prevented from changing from the first lane to the second lane. Especially when a collision threatens, the driver of the vehicle is prevented from jerking the steering wheel, if for example, he panics.

In another advantageous embodiment of the invention, provision is made that the driver assistance system automatically guides the vehicle back into the first lane, as soon as a threatened collision with the other vehicle is detected and the vehicle has at least partially moved out of the first lane. In other words, the vehicle thus automatically goes back to the first lane, so that a collision, which would be probably with a continuation of the lane change, can be prevented.

Another advantageous embodiment of the invention makes provision that the monitoring system monitors a second monitored area including the first lane by sectors and moves the vehicle back into the first lane only if no additional vehicle is situated in the second monitored area. Thus, before possibly returning the vehicle to the first lane, first a determination is made of whether there is already another vehicle too close to the vehicle in the first lane, as viewed in the longitudinal direction of the roadway, so that it automatically returns to the first lane only if no other vehicles making up the traffic flow are endangered thereby.

In another advantageous embodiment of the vehicle, provision is made that the size of the first and/or the second monitored area, especially in the longitudinal direction of the roadway, is adjusted depending on the current speed of the vehicle and/or on the currently permitted speed limit. By adjusting the monitored area in dependence on speed, other vehicles can be detected in timely fashion, so that a possible danger of collision can be correctly assessed when the vehicle changes lanes.

The invention-specific motor vehicle comprises a monitoring system, which is designed to detect an impending lane change by the vehicle from a first lane to an adjoining second lane, as well as an impending lane change of a second vehicle from a third lane that adjoins the second lane, to the second lane, and to determine whether a collision threatens if the vehicle changes lanes. In addition the vehicle includes a warning device which is designed to issue a warning as soon as a threatened collision with the other vehicle is determined. Additionally, the motor vehicle includes a driver assistance system, which is designed to effect transverse guidance of the vehicle, as soon as a threatened collision with the other vehicle has been determined. Advantageous embodiments of the invention-specific method are to be viewed as advantageous embodiments of the invention-specific motor vehicle, with the vehicle especially comprising means to carry out the procedural steps.

Additional advantages, features and particulars of the invention are drawn from embodiment examples in the specification that follows, and using the figures. The features and combinations of features named above, as well as the figures and combinations of features named in what follows in the description of features and/or in the figures, are applicable not only in the particular combination indicated, but also in other combinations or as stand-alone items, without departing from the scope of the invention.

Figure 2:
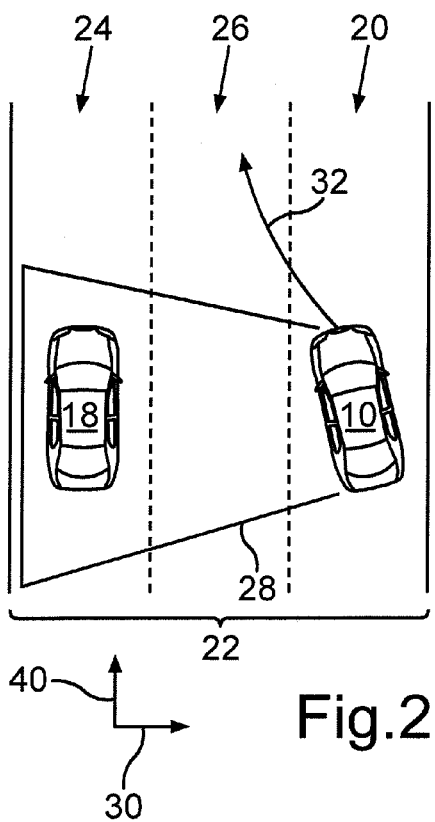

Embodiment examples of the invention are explained in greater detail in what follows using the schematic figures. Shown are:

FIG. 1: a schematic depiction of a motor vehicle with a monitoring system for collision avoidance when the vehicle changes lanes;

FIG. 2: a schematic depiction of a roadway comprising three lanes, wherein the vehicle shown in FIG. 1 is currently traveling in the rightmost lane, and another vehicle is traveling in the leftmost lane.

Figure 3:
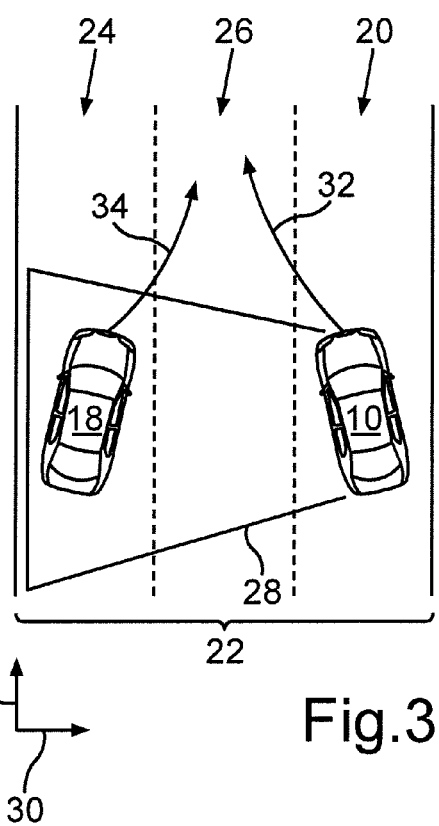
Figure 4:
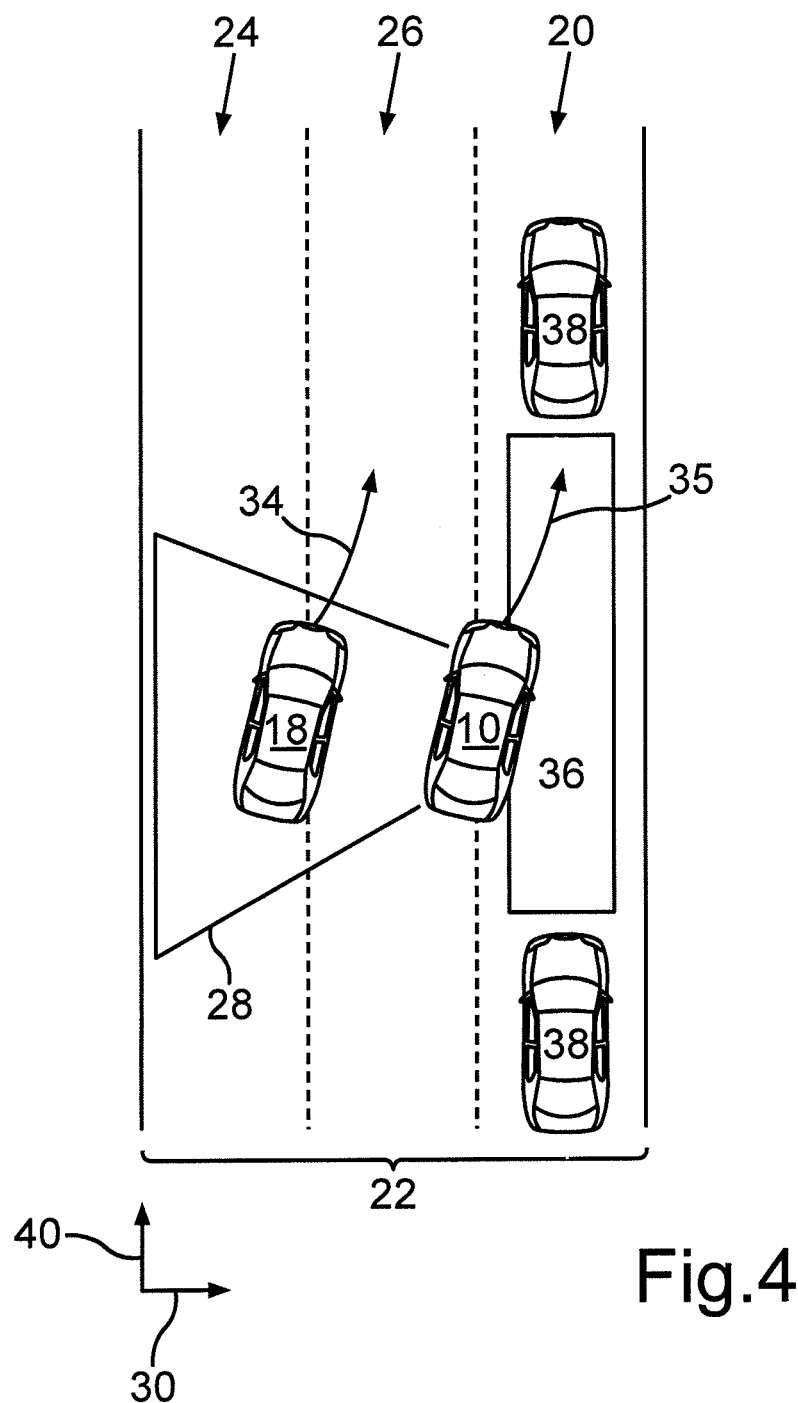

FIG. 3: another schematic depiction of the roadway, wherein two vehicles have initiated a change of lanes from their particular lane to the middle lane FIG. 4: another schematic depiction of the roadway, in which the right vehicle has stopped moving to the middle lane and been guided back to the rightmost lane.

A motor vehicle 10 is shown in a schematic depiction in FIG. 1. The motor vehicle 10 comprises a monitoring system 12, a warning device 14 and a driver assistance system 16.

FIG. 2 shows vehicle 10 and another vehicle 18, with vehicle 10 moving in the right lane 20 of a roadway 22 and vehicle 18 moving on the leftmost lane 24 of the roadway 22. In the instance shown here, nothing is moving in the center lane 26. The roadway can be a portion of a superhighway, where all three lanes 20, 24, 26 are to be passed over in the same direction. Alternatively, this can be a multilane highway in a city or the like, on which travel is one-way in the same direction in all three lanes 20, 24, 26.

The monitoring system 12 is designed to detect an impending lane change of motor vehicle 10, for example from the right lane 20 to the middle lane 26. In addition, the monitoring system 12 is designed to detect an impending lane change of vehicle 18, for example from the left lane 24 to the right lane 26. Additionally, the monitoring system is designed to determine whether, when vehicle 10 changes lanes, a collision is threatened with the other vehicle 18, if the latter likewise changes into this same lane 26. The monitoring system 12 can for example comprise a camera system, by means of which a first monitored area 28 that comprises the center lane 26 and the left lane 24 by zones, can be monitored. Alternatively, or additionally, the monitoring system 12 can also exhibit radar-based or lidar-based detection devices, by means of which the monitored area 28 can be monitored.

If a collision threatens, the warning device 14 can for example issue a warning signal optically by means of a display in vehicle 10, and/or acoustically, via a speaker in vehicle 10. Alternatively, or additionally, provision can also be made that the warning device causes the steering wheel to vibrate, to warn the driver of vehicle 10 of a possibly threatened collision by means of a haptically detectable warning signal.

In what follows, a method is explained for driving the vehicle 10 when changing a lane. First the monitoring system 12 detects an impending lane change by vehicle 10 from the right lane 20 to the adjoining center lane 26. An appropriate blinker activation and/or a steering motion to that effect indicates that the vehicle 10 is about to change lanes.

Then the monitoring system 12 detects an impending lane change of the other vehicle 18 from the leftmost lane 24 to the middle lane 26. That a lane change of the other vehicle is imminent, is likewise detected by means of detecting an activated blinker and/or detecting motion of the vehicle 18 in the transverse direction 30 of the roadway 22. As soon as the monitoring system 12 detects that both vehicles 10, 18 are about to change lanes, using the warning device 14, a warning is issued, to warn the driver of vehicle 10 that the other vehicle 18, located at the same horizontal point, likewise wishes to change lanes, as is indicated in FIG. 3.

As long as the other vehicle 18 is located in the first monitoring area 28, the motion of vehicle 18 is detected by monitoring system 12, wherein, using it, vehicle 18 is detected to be about to change lanes. Especially, as long as vehicle 18 is located in the first monitoring area 28, the relative motion of vehicle 18 vis-à-vis that of vehicle 10 is detected, and using it, a determination is made of whether a collision is threatened of vehicle 10 when it changes from the rightmost lane 20 to the middle lane 26. For example, using the particular detection of the current motions of vehicle 10 and of the other vehicle 18, the monitoring system 12 can extrapolate a particular motion trajectory 32, 34, using which a collision probability is determined when the two vehicles 10, 18 execute the lane changes. Thus, in the situation shown in FIG. 3, if the two vehicles 10, 18 simultaneously change lanes, the two vehicles 10, 18 will collide in the middle lane 26.

As soon as the monitoring system detects that a collision threatens with the other vehicle 18, again a warning signal is emitted, which warns the driver of vehicle 10 of a possibly impending collision with the other vehicle 18. Should the driver of vehicle 10 continue to wish to change lanes and steers vehicle 10 to that effect, in a first step the driver assistance system 16 makes implementation of the impending lane change difficult, in that the torque to be applied to the steering wheel of vehicle 10 increases, by which more pronounced steering of vehicle 10, to the left in the present instance, becomes more difficult. If this fails to get the desired result, the driver assistance system 16 prevents the planned lane change from occurring, as long as a collision with the other vehicle 18 continues to be a threat.

FIG. 4 again shows the roadway 22 in another schematic depiction, wherein, in the instance shown there, the vehicle 10 is automatically guided back to the original lane 20 as per the trajectory indicated by arrow 35. The driver assistance system 16 automatically moves vehicle 10 back into the rightmost lane 20, since a danger of collision with the other vehicle 18 continues to be detected and vehicle 10 has already at least partially gone out of the rightmost lane 20. However, before vehicle 10 is automatically guided back into the right lane 20, monitoring system 12 is monitoring a second monitoring area 36 that partially includes the right lane 20. Vehicle 10 is only moved back into the first lane 20, if no additional vehicle 38 is located in the monitoring area 36.

In the instance depicted above, the vehicles 38 are operating outside the second monitoring area 36, so that vehicle 10 can automatically and safely be moved back by means of driver assistance system 16 into the right lane 20, to avoid a collision with the other vehicle 18, which, heedless of the dangerous situation, continues to change lanes from the left lane 24 to the middle lane 26. Alternatively, the monitoring area 36 in the longitudinal direction 40 of roadway 22 can also be chosen to be larger, so that corresponding relative motions between vehicle 10 and the vehicles 38 traveling in the right lane 20 can be detected. Depending on whether, for example, vehicle 10 is approaching forward vehicle 38 at too great a speed, or whether the rearward vehicle 38 is approaching vehicle 10 too quickly in the longitudinal direction of roadway 22, vehicle 10 can be prevented from moving back from the center lane 26 to the right lane 20.

To prevent threatened collisions with other vehicles 18, 38 during corresponding lane changes, the particular size of the first monitored area 28 and of the second monitored area 36 in the longitudinal direction 40 of roadway 22 is adjusted, in dependence on the current speed of vehicle 10 and/or in dependence on a currently permitted speed limit on the section of roadway 22 just then being ridden over.

Thus, the higher the speed at which vehicle 10 just then is moving, or the higher the current permissible speed limit is on the roadway section, the larger the particular monitoring areas 28, 36 are set in the longitudinal direction of the roadway. And conversely, the extent or the size of the monitoring areas 28, 36 should be selected to be smaller in the longitudinal direction of the roadway 40, the lower the current speed is of vehicle 10 or the current speed limit is on the roadway section traveled upon. By this means, collisions are avoided when changing lanes that are adjusted to the situation but nevertheless reliable.

The invention claimed is:

1. Method for operating a motor vehicle when changing lanes on a roadway comprising at least three lanes, comprising the steps:
   detection by a monitoring system in the vehicle of an impending lane change of the motor vehicle from a first lane to an adjoining second lane;
   detection of an impending lane change by another vehicle from a third lane that adjoins the second lane, to the second lane, wherein a first monitored area that comprises the second lane and the third lane is monitored by zones by means of the monitoring system;
   the monitoring system determining whether a collision with the other vehicle threatens if the vehicle changes lanes;
   as soon as a threatened collision is determined, a warning signal is issued by a warning device and/or the motor vehicle is influenced in its lateral motion by a driver assistance system of the vehicle, characterized in that
   the vehicle is automatically moved back into the first lane by the driver assistance system, as soon as it is determined that there is a threat of a collision with the other vehicle and the vehicle has at least partially departed from the first lane; and the size of the first monitoring area, in the longitudinal direction of the roadway is adjusted in dependence on a currently permissible speed limit.

2. Method according to claim 1, characterized in that it is determined that the vehicle is about to change lanes by means of a corresponding blinker activation and/or by a steering motion to that effect of the vehicle.

3. Method according to claim 1, characterized in that it is determined that the other vehicle is about to change lanes by means of a corresponding blinker activation and/or a transverse motion of the other vehicle on the roadway.

4. Method according to claim 1, characterized in that the warning signal is issued when it has been detected that the motor vehicle and the other vehicle are about to change lanes.

5. Method according to claim 1, characterized in that as long as the other vehicle is in the first monitoring area, the motion of the other vehicle is detected and, using it, a determination is made that a lane change by the other vehicle is impending.

6. Method according to claim 1, characterized in that as long as the other vehicle is in the first monitoring area, the relative motion of the other vehicle vis-à-vis the vehicle is detected and, using this, a determination is made of whether a collision threatens of the vehicle with the other vehicle if the vehicle changes lanes.

7. Method according to claim 1, characterized in that an impending lane change is made more difficult by the driver assistance system by an increase in torque required to be applied to a steering wheel of the vehicle or is prevented by the driver assistance system or by issuance of the warning signal, as soon as a threatened collision has been determined with the other vehicle.

8. Method according to claim 1, characterized in that by means of the monitoring system a second monitored area that comprises the first lane by zones is monitored, and the vehicle only moves back into the first lane if no additional vehicle is in the second monitored area.

9. Method according to claim 8, characterized in that the size of the second monitoring area, in the longitudinal direction of the roadway, is adjusted in dependence on the current speed of the vehicle and/or on a currently permissible speed limit.

10. Method according to claim 1, characterized in that the size of the first monitoring area, in the longitudinal direction of the roadway, is also adjusted in dependence on the current speed of the vehicle.

11. Motor vehicle with:

a monitoring system which is designed:
to detect an imminent lane change of a vehicle from a first lane to an adjoining second lane;
to detect an impending lane change of a second vehicle from a third lane adjoining the second lane to the second lane;
to monitor a first monitoring area comprising the second lane and third lane by zones;
to determine whether a collision is threatened with the other vehicle when the vehicle changes lanes;

a warning device which is designed to issue a warning signal as soon as a collision with the other vehicle becomes a threat;

a driver assistance system which is designed to effect transverse guidance on the vehicle, as soon as a threatened collision with the other vehicle has been determined;

characterized in that the driver assistance system is designed to automatically move vehicle back into the first lane, as soon as a threatened collision with the other vehicle has been determined and the vehicle has at least partially moved out of the first lane;

the monitoring system is designed to adapt the size of the first monitoring area, in the longitudinal direction of the roadway, depending on a current permissible speed limit.

* * * * *